United States Patent [19]
Prakash et al.

[11] Patent Number: 6,125,317
[45] Date of Patent: Sep. 26, 2000

[54] ENCODER ERROR DETECTION FOR AN AUTOMATIC FOUR-WHEEL-DRIVE VEHICLE

[75] Inventors: Rajiva Prakash, Westland; Vincent Frank Amatangelo, Northville, both of Mich.

[73] Assignee: Ford Global Technologies, Dearborn, Mich.

[21] Appl. No.: 08/999,155

[22] Filed: Dec. 29, 1997

[51] Int. Cl.[7] .................................................. B60K 23/08
[52] U.S. Cl. .............................. 701/69; 701/29; 180/248
[58] Field of Search ........................ 701/69, 29; 180/247, 180/248; 340/456

[56] References Cited

U.S. PATENT DOCUMENTS

| | | |
|---|---|---|
| 4,664,217 | 5/1987 | Welch et al. . |
| 4,846,010 | 7/1989 | Fujikawa et al. . |
| 5,033,575 | 7/1991 | Takeshita et al. . |
| 5,092,188 | 3/1992 | Fujikawa et al. . |
| 5,150,637 | 9/1992 | Ninomiya et al. . |
| 5,170,343 | 12/1992 | Matsuda . |
| 5,212,640 | 5/1993 | Matsuda . |
| 5,215,161 | 6/1993 | Kobayashi . |
| 5,226,860 | 7/1993 | Baxter, Jr. et al. . |
| 5,323,871 | 6/1994 | Wilson et al. . |
| 5,377,127 | 12/1994 | Gibson et al. . |
| 5,400,866 | 3/1995 | Wilson et al. . |
| 5,407,024 | 4/1995 | Watson et al. ............................ 180/248 |
| 5,409,429 | 4/1995 | Showalter et al. . |
| 5,507,704 | 4/1996 | Lasoen . |
| 5,520,590 | 5/1996 | Showalter et al. . |
| 5,522,776 | 6/1996 | Alvey . |
| 5,582,263 | 12/1996 | Varma et al. . |
| 5,699,870 | 12/1997 | Warren ..................................... 180/247 |

*Primary Examiner*—Michael J. Zanelli
*Attorney, Agent, or Firm*—Ford Global Technologies, Inc.

[57] ABSTRACT

A method for controlling a transfer case in a four wheel drive vehicle is provided. The transfer case has a neutral state and a plurality of drive modes. A MSS having a plurality of positions is provided for selecting the drive modes. An upshift relay and a downshift relay energize a motor to effect a shift of the transfer case to the selected drive mode. An encoder detects a value corresponding to the rotational position of the motor. The method senses if the encoder has lost power, and upon sensing the encoder has lost power, compares a current MSS position with a MSS position prior to losing power to the encoder. If the current and prior MSS positions differ, the most recent valid MSS position is determined. Whether the upshift and downshift relays are turned "on" is established. The direction of rotation of the motor is established. The desired motor destination is established. The direction in which to rotate the motor and the maximum time to allow the motor to rotate to achieve the desired destination are established.

20 Claims, 15 Drawing Sheets

| Dir_Travel | Motor_Stopped | AT_Dest | | Dir_Constraint |
|---|---|---|---|---|
| UP | T | x | | NONE |
| | F | T | | NONE |
| | F | F | | DN |
| DN | T | x | | NONE |
| | F | T | | NONE |
| | F | F | | UP |
| UNKNOWN | x | x | | NONE |
| x | UNKNOWN | x | | NONE |
| x | x | UNKNOWN | | NONE |

| Enc_Pos | Enc_Pos_Mod_Old | Dir_Travel | Enc_Pos_Mod | Comments |
|---|---|---|---|---|
| 2H | x | x | 2H | Enc_Pos_Mod = Enc_Pos for all these cases. |
| BG1 | x | x | BG1 | |
| 4H | x | x | 4H | |
| N | x | x | N | |
| BG4 | x | x | BG4 | |
| 4L | x | x | 4L | |
| INVALID | x | x | INVALID | |
| UNKNOWN | x | x | UNKNOWN | |
| BG2 | BG1 | x | BG1 | Enc_Pos_Mod = Enc_Pos for all these cases. |
| BG2 | BG2? | x | BG2? | |
| BG2 | BG21 | x | BG21 | |
| BG2 | BG22 | x | BG22 | |
| BG2 | 4H | UP | BG21 | Dir_Travel is needed for these three cases |
| BG2 | 4H | DN | BG22 | |
| BG2 | 4H | UNKNOWN | BG2? | |
| BG2 | BG31 | x | BG22 | |
| BG2 | 2H | x | BG2? | Enc_Pos_Mod = BG2? for all these cases |
| BG2 | BG3? | x | BG22 | |
| BG2 | BG32 | x | BG2? | |
| BG2 | N | x | BG2? | |
| BG2 | BG4 | x | BG2? | |
| BG2 | 4L | x | BG2? | |
| BG2 | INVALID | x | BG2? | |
| BG2 | UNKNOWN | x | BG2? | |
| BG3 | BG4 | x | BG32 | Enc_Pos_Mod = Enc_Pos for these three cases |
| BG3 | BG3? | x | BG3? | |
| BG3 | BG31 | x | BG31 | |
| BG3 | BG32 | x | BG32 | |
| BG3 | N | UP | BG31 | Dir_Travel is needed for these three cases |
| BG3 | N | DN | BG32 | |
| BG3 | N | UNKNOWN | BG3? | |
| BG3 | BG22 | x | BG31 | |
| BG3 | 2H | x | BG3? | Enc_Pos_Mod = BG3? for all these cases |
| BG3 | BG1 | x | BG3? | |
| BG3 | BG2? | x | BG31 | |
| BG3 | BG21 | x | BG3? | |
| BG3 | 4H | x | BG3? | |
| BG3 | 4L | x | BG3? | |
| BG3 | INVALID | x | BG3? | |
| BG3 | UNKNOWN | x | BG3? | |

*Figure 6*

| Shorthand for the Transition | Description of the Transition |
|---|---|
| 720 A | ( Dir_Req = UP ) & ( Ctr2<N2 ) & ( Dwell_Period )_Elpsd_Tmr ( T ) <br><br> Upshift_Rly = ON; Dest_State = Dest_State_Req; Dir_Travel = Dir_Req; Start ( Tmax )_Elpsd_Tmr; Motor_Stopped = F; At_Dest = F |
| 722 B | ( Dir_Req = DN ) & ( Ctr1<N1 ) & ( Dwell_Period )_Elpsd_Tmr ( T ) <br><br> Upshift_Rly = ON; Dest_State = Dest_State_Req; Dir_Travel = Dir_Req; Start ( Tmax )_Elpsd_Tmr; Motor_Stopped = F; At_Dest = F |

| Ignition Key | Voltage out of bounds? | Tcase at a main-stop? | Action |
|---|---|---|---|
| START | x | x | No shift-commands |
| RUN | T | x | No shift-commands |
| RUN | F | F | Proper shift-commands through the table |
| RUN | F | T | Proper shift-commands through the table |
| ACC, OFF, LOCK or out-of-cylinder | x | T | No shift-commands |
| ACC, OFF, LOCK or out-of-cylinder | x | F | Proper shift-commands through the table |

Figure 7C

| Enc_Pos_Mod | MSS | Dir_Travel | Shift_Com | Stop Motor |
|---|---|---|---|---|
| 2H | 2H or INVALID | x | x | T |
| 4H | 4H or INVALID | x | x | T |
| 4L | 4L or INVALID | x | x | T |
| 4H or BG22 or BG31 or SC2 | x | DN | F | T |
| 4L or BG4 or BG32 | x | UP | F | T |

| Row # | Enc_Pos_Mod | MSS | Dir_Constraint | Shift_Com | Dest_State_Req | Dir_Req | Tmax |
|---|---|---|---|---|---|---|---|
| 1 | 2H | 2H or INVALID | x | x | NONE | OFF | 0 |
| 2 | | 4H or 4L | x | x | 4H | DN | T2 |
| 3 | | 2H | x | x | 2H | UP | T1 |
| 4 | 4H | 4H or INVALID | x | x | NONE | OFF | 0 |
| 5 | | 4L | x | T | 4L | DN | T3 |
| 6 | | | x | F | NONE | OFF | 0 |
| 7 | | 2H or 4H | x | T | 4H | UP | T3 |
| 8 | 4L | | x | F | NONE | OFF | 0 |
| 9 | | 4L or INVALID | x | x | NONE | OFF | 0 |
| 11 | | 2H or 4H | UP or NONE | x | 4H | UP | T1 |
| 12 | N | or INVALID | DN | x | 4L | DN | T1 |
| 13 | | 4L | UP | x | 4H | UP | T1 |
| 14 | | | DN or NONE | x | 4L | DN | T1 |
| 15 | BG1 or BG21 | x | UP | x | 2H | UP | T1 |
| 16 | | | DN or NONE | x | 4H | DN | T2 |
| 17 | | | UP or NONE | x | 4H | UP | T2 |
| 18 | | 2H or 4H | DN | T | 4L | DN | T3 |
| 19 | | or INVALID | | F | NONE | OFF | 0 |
| 20 | BG22 or BG31 | | UP | x | 4H | UP | T2 |
| 21 | | | DN | T | 4L | DN | T3 |
| 22 | | 4L | | F | NONE | OFF | 0 |
| 23 | | | NONE | T | 4L | DN | T3 |
| 24 | | | | F | 4H | UP | T2 |
| 25 | | | UP | T | 4H | UP | T3 |
| 26 | | | | F | NONE | OFF | 0 |
| 27 | | 2H or 4H | DN | x | 4L | DN | T2 |
| 28 | | | NONE | T | 4H | UP | T3 |
| 29 | BG32 or BG4 | | | F | 4L | DN | T2 |
| 30 | | | UP | T | 4H | UP | T3 |
| 31 | | 4L | | F | NONE | OFF | 0 |
| 32 | | or INVALID | DN or NONE | x | 4L | DN | T2 |
| 33 | | | DN | T | 4L | DN | T3 |
| 34 | BG2? | x | | F | NONE | OFF | 0 |
| 35 | | | UP or NONE | x | 2H | UP | T2 |
| 36 | BG3? | x | x | F | NONE | OFF | 0 |
| 37 | | x | x | T | 4H | UP | T2 |
| | SC1 | x | x | x | 2H | DN | T2 |
| | SC2 | x | x | T | 4L | UP | T1 |
| 39 | INVALID | x | x | x | NONE | OFF | 0 |
| 40 | UNKNOWN | x | x | x | NONE | OFF | 0 |
| 41 | x | UNKNOWN | x | x | NONE | OFF | 0 |

*Figure 8*

|  | Name | Definition | Domain |
|---|---|---|---|
| Inputs | Enc_Pwr_Loss_Fault | Encoder-Power-Loss Fault Flag | T,F |
|  | Enc_Pos_Prev_Valid | Encoder-Position : Most Recent Valid Value ( Different from Current ) | 2H, 4H, 4L, N, Xi ( i=1,2,3 ), INVALID UNKNOWN |
|  | Upshift_Rly | Upshift-Relay | ON, OFF |
|  | Dnshift_Rly | Dnshift-Relay | ON, OFF |
|  | Dir_Travel | Direction of Motor Travel | UP, DN, UNKNOWN |
| Outputs | Dest_State_Req | Destination State Requested | 2H, 4H, 4L, NONE |
|  | Dir_Req | Direction Requested | UP, DN, OFF |
|  | Tmax | Maximum Time allowed for shift | Numeric ( in units of seconds ) |
|  | Stop_Motor | Stop the Motor ? | T, F |
| Calibratable Parameters | T5 | - | Numeric ( units of seconds ) Range : 0-5 sec. Current Setting : 1 sec. |
|  | T6 | - | Numeric ( units of seconds ) Range : 0-5 sec. Current Setting : 2 sec. |
|  | T7 | - | Numeric ( units of seconds ) Range : 0-5 sec. Current Setting : 3 sec. |
| Internal Variables | Tmp1 | Valid Valid of Enc_Pos before the onset of fault | 2H, 4H, 4L, N, Xi ( i=1,2,3 ), INVALID UNKNOWN |
|  | Tmp2 | Direction of travel if the motor was energized at the instant the fault was set | UP, DN, OFF |
|  | Tmp3 | Tmax value for the "shift-to-rail" shift-command | Numeric ( units of seconds ) Range : 0-5 sec. |

*Figure 13*

|  | Name | Definition | Domain |
|---|---|---|---|
| Inputs | Enc_Pos | Encoder-Position | 2H, 4H, 4L, N, X1, X2, X3, INVALID, UNKNOWN |
|  | Shift_Con_Raw | Shift-Condition-Raw | T, F |
|  | Motor_On_Unwarranted | Motor-On-Unwarranted Fault Flag | T, F |
|  | Inadvertent_Dir | Inadvertent Direction | UP, DN, NONE |
| Outputs | Dir_Req | Direction Requested | UP, DN, OFF |
|  | Both_Relays_On | Turn Both Relays On | T, F |

Figure 15a

| Enc_Pos | Inadvertent_Dir | Shift_Con_Raw | Both_Relays_On |
|---|---|---|---|
| 2H or 4H or 4L | x | x | T |
| X2 | DN | F | T |
| X3 | UP | F | T |

Figure 15b

|  | Name | Definition | Domain |
|---|---|---|---|
| Inputs | MSS | Mode Select Switch input | 2H, 4H, 4L, UNKNOWN, INVALID |
|  | MSS_Prev_Valid | Mode Select Switch input- Most Recent ( but not current ) Valid Value | 2H, 4H, 4L, UNKNOWN, INVALID |
|  | Shift_Con_Raw | Shift-Condition-Raw | T, F |
|  | Upshift_Rly | Upshift-Relay | ON, OFF |
|  | Dnshift_Rly | Dnshift-Relay | ON, OFF |
| Outputs | Desti_State_Req | Destination State Requested | 2H, 4H, 4L, NONE |
|  | Dir_Req | Direction Requested | UP, DN, OFF |
|  | Tmax | Maximum Time allowed for shift | Numeric ( in units of seconds ) |
|  | Stop_Motor | Stop-Motor Command | T, F |
| Calibratable Parameter | T7 | - | Numeric ( seconds ) Range: 0-5 sec. Current Setting: 3 sec. |

Figure 16

ENCODER ERROR DETECTION FOR AN AUTOMATIC FOUR-WHEEL-DRIVE VEHICLE

TECHNICAL FIELD

The present invention relates to detection of operating faults for an encoder in an automatic transfer case of a four-wheel-drive vehicle and proposes a method of operation for such faults.

BACKGROUND OF THE INVENTION

The present invention is an improvement in four-wheel-drive powertrains having an internal combustion engine and a multiple-ratio, geared transmission. The crankshaft of the engine is connected to torque input gearing of the transmission and the output shaft of the transmission is connected to a rear drive shaft, which delivers torque to a rear differential and to rear traction wheels for the vehicle.

A transfer case normally is used to provide a torque flow path to the front vehicle wheels of a four wheel drive vehicle or an all-wheel drive vehicle. The transfer case in a typical arrangement is assembled on the housing of the multiple-ratio transmission. A drive chain may be used to connect drivably a torque output element of the transmission to a torque input element of the transfer gear case. The power input shaft of the transfer gear case, in a typical environment, is connected to a sun gear of a planetary gear unit. The ring gear of the planetary gear unit is fixed. A carrier for such planetary gear units carries a pinion assembly comprising pinions drivably engaged with the sun gear and the ring gear. The carrier is the torque output element of the transfer case planetary gearing.

A positive engagement clutch may be used to connect drivably the rear output shaft of the transfer case to the power input shaft for the transfer case, the latter being connected to the output of the multiple-ratio transmission. When the positive engagement clutch is shifted in the opposite direction, the power input sun gear drives the rear output shaft for the transfer case through the planetary gearing as the carrier becomes connected to the rear output shaft. When the positive engagement clutch is moved to an intermediate position, the torque delivery path from the power input shaft for the transfer case is interrupted and a connection between the rear output shaft and the carrier is disestablished, placing the drivetrain in a "neutral" state.

The transfer case has three operating modes; i.e., a two-wheel mode, a four-wheel high-speed mode and a four-wheel low-speed mode. A neutral position exists between the four wheel high and four wheel low modes. A secondary clutch assembly is used to disconnect the drive chain from the rear output shaft if it is desired to operate the vehicle in the two-wheel-drive mode. A motor is provided to shift the transfer case between operating modes.

The transfer case may not complete a shift to the desired mode due to several factors, including the motor stopping before the shift is complete, the driver moving a switch to change the desired operating mode before a shift is complete, and an error which instructs the motor not to complete a shift.

U.S. Pat. No. 4,664,217 to Welch et al describes a system where a controller requires the vehicle speed to be approximately zero and the transmission to be in a neutral state for a time of 0.1–0.5 seconds when shifting the transfer case between neutral and either 4H or 4L, or vice-versa, then the transfer case may be shifted into a selected 4 wheel drive mode. However, the '217 patent does not provide further safeguards included in the present disclosure to protect the transfer case and to prevent the transfer case from being left in a neutral state.

It would be desirable to provide further protection for the transfer case and to prevent the transfer case from being left in a neutral state and to provide an operating strategy in the event of error detection.

BRIEF DESCRIPTION OF THE INVENTION

Improvements of the present invention comprise an operating strategy for protecting and actuating the motor which shifts the transfer case between operating modes.

According to the present invention, a method of operating a transfer case in an automatic four-wheel-drive driveline is provided. The transfer case has a neutral state and a plurality of drive modes. A MSS having a plurality of positions is provided for selecting the drive modes. An upshift relay and a downshift relay energize a motor to effect a shift of the transfer case to the selected drive mode. An encoder detects a value corresponding to the rotational position of the motor. The method senses if the encoder has lost power, and upon sensing the encoder has lost power, compares a current MSS position with a MSS position prior to losing power to the encoder. If the current and prior MSS positions differ, the most recent valid MSS position is determined. Whether the upshift and downshift relays are turned "on" is established. The direction of rotation of the motor is established. The desired motor destination is established. The direction in which to rotate the motor and the maximum time to allow the motor to rotate to achieve the desired destination are established.

Advantages of the present invention include operating strategies to ensure the transfer case is not left in neutral upon detection of several faults and prevent the transfer case from traveling through neutral when shift conditions are not met.

BRIEF DESCRIPTION OF THE DRAWINGS

FIG. 6 is a table for determining the current encoder position according to the present invention;

FIG. 7A illustrates the transitions of FIG. 7 whereby the motor is permitted to enter the state of upshifting or downshifting;

FIG. 7B presents a table for actions which may occur for a given ignition switch position;

FIG. 7C presents a table for events which may cause the motor to be commanded to stop;

FIG. 8 is a tabular representation of synthesizing shift commands to control the motor destination, direction and time to reach the destination;

FIG. 13 is a table listing variables and parameters for operation when encoder power is lost.

FIGS. 15a and 15b provide variables and parameters for operation when a fault is detected for the motor being on when not commanded.

FIG. 16 is a table providing variables and parameters for operation when the encoder provides a bad signal.

DETAILED DESCRIPTION OF THE PREFERRED EMBODIMENTS

Variables Defined

Figure 1:
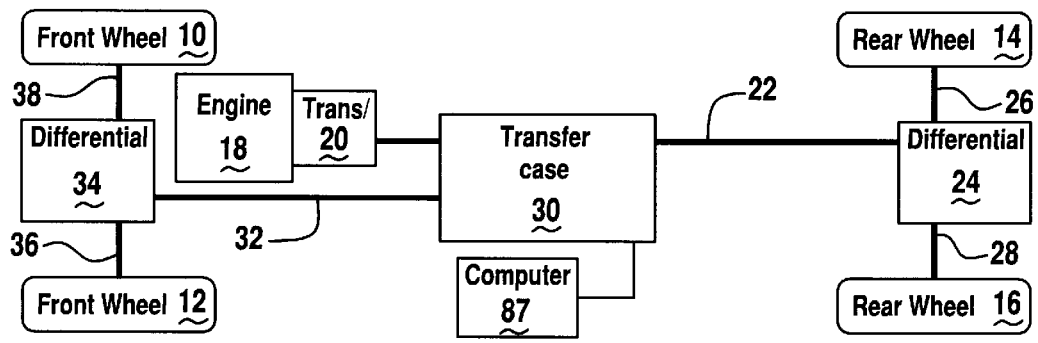
FIG. 1 is a schematic representation of a motor vehicle including a transfer case in a four-wheel-drive powertrain.

For the purpose of this application, the following definitions are used:

Input Variables

Init: This is the input flag to cause software initialization. Domain is T/F.

Under_Voltage: This is the input flag (T/F) to indicate the situation that battery voltage is "too low".

Over_Voltage: This is the input flag (T/F) to indicate the situation that battery voltage is "too high".

MSS: The driver requests a particular drive mode request through the Mode Select Switch (MSS). The possible values of this variable are 2H, 4H, and 4L.

MSS_Old: It is the value of MSS in the previous repetition cycle.

Ig_Key: This variable contains information on the current value of the ignition key-switch. Possible values are RUN, START, OFF, ACC.

Ig_Key_Old: It is simply equal to Ig_Key value of the previous repetition cycle.

Enc_Pos: This variable indicates the encoder position. Depending on the encoder design, there could be between-gear states and, of course, terminal positions (2H, 4H, and 4L here). For the sake of descriptions, we are assuming the following order of gears/encoder positions: 2H, BG1, BG2, 4H, BG2, BG3, N, BG3, BG4, and 4L where BG's are between-gear positions and the terminal positions are 2H, 4H, and 4L. The gears are represented schematically in FIG. 3 which also defines the directions "UP" and "DN".

Enc_Pos_Old: It is the value of Enc_Pos in the previous repetition cycle.

AT_Neutral: This binary signal indicates whether automatic transmission is in Neutral or not. If the vehicle is manual-shift type, this signal is never T.

MT_Clutch_Pressed: This binary signal indicates whether the clutch in the manual transmission vehicle is pressed or not. With an automatic transmission, this signal is never T.

Veh_Spd: This is vehicle speed value in MPH. The vehicle speed sensor signals are processed and scaled to come up with this value in a known manner.

Brake_Pedal: This signal indicates whether the brake is pressed. Domain is T/F. The brake switch is used to derive this variable.

Output Variables and Internal Variables

Shift_Con_Raw: This is the flag that indicates whether all shift conditions are met. All three of the following conditions must be met for Shift_Con_Raw to be T:

The engine is disengaged from the transfer case (i.e., in case of automatic transmission, "Neutral" has been selected; and in case of manual transmission, the clutch is pressed).

Vehicle speed is below a calibratable threshold (preferably about 3 MPH);

Brake is pressed;

Shift_Con: This is derived from Shift_Con_Raw; except that it comes on after a short-delay following Shift_Con_Raw.

Shift_Con_Dly: This calibratable variable (unit: seconds) is the time-delay to determine the Shift_Con variable. Preferably approximately 1 second or less.

Enc_Pos_Mod: This variable is a modification of Enc_Pos. The information of direction of travel is used to split codes BG2 and BG, into distinct physical positions. The domain of Enc_Pos_Mod is: 2H, BG1, BG21, 4H, BG22, BG31, N, BG32, BG4, and 4L. In addition, the values of BG2? and BG3?, are possible due to wrong codes obtained occasionally on account of noise or transients that may seep in despite of filters and debouncing.

Enc_Pos_Mod_Old: It is the value of Enc_Pos_Mod in the previous repetition cycle.

Dest_State_Req: This is one component of the three-part shift-command issued to motor. Its domain is 2H, 4H, 4L.

Dir_Req: This is also a part of the shift-command. The domain is UP or DN.

Tmax: This last part of the shift-command package is the maximum time allowed for motor to get to the destination. Its units are seconds and is variable.

Stop_Motor: This command (domain: T/F) is to stop the motor immediately if certain conditions are met.

Ti(i=1,2,3,4) These calibratable parameters are the values for Tmax variable. Preferably, T1=0.75, T2=1.25, T3=2.0, and T4=2.5 sec.

Dir_Constraint: This variable dictates which direction the motor must turn (if at all) in the next shift-attempt. The rationale is that if the motor is "stuck" going in a first direction, it must be commanded to go in the opposite direction the next time around.

Dwell_Period: This is a small number for which the motor is forced to rest after any shift, preferably 0.75 second.

Rest_Period: After the number N1 or N2 is reached in shift-maneuvers, the motor is made to rest for Rest_Period. A preferred value chosen is 40 seconds.

N1: This calibratable parameter (positive integer) is the max value for the shift-attempts made in DN direction (before reaching a destination) until the motor rests for the assigned Rest-period.

N2: This calibratable parameter (positive integer) is the max value for the shift-attempts made in UP direction (before making it to a destination) until the motor rests for the assigned Rest-period.

Ctr1: This variable counts the attempts as spoken of in the definition of N1.

Ctr2: This variable counts the attempts as spoken of in the definition of N2.

Upshift_Rly: This variable represents the state of the Upshift relay. and the domain is ON/OFF. If it is ON, the micro-end of the relay is grounded; open for OFF.

Dnshift_Rly: The description is analogous to the Upshift_Rly.

Dir_Travel: This variable represents the direction of travel of the motor; its possible values are UP, DN and OFF. If the motor is turning at the moment. Dir_Travel is the direction of the motor, and if the motor is stationary, it is the direction of travel in the last round of motion. The value is OFF at system initialization (since there is no "last" round of motion).

Dest_State: This variable contains the destination state, and its possible values are 2H, 4H and 4L. If the motor is currently rotating, Dest_State represents the destination assigned for the mission: otherwise it is the destination in the last round of motion.

At_Dest: This is a binary variable (Domain=T, F, UNKNOWN), representing whether the motor is at the assigned destination. If the motor is currently rotating, At_Dest=F and if the motor is stationary, it could be T or F depending on whether the destination was reached in the last round of motion. At initialization, At_Dest is set as UNKNOWN.

Motor_Stopped: If the motor is running, Motor_Stopped= F. If the motor is currently stationary, Motor_Stopped depends on the previous round of motion: "F" if the motor stopped normally with destination reached or with timer out. "T" if the motor was forced to a stop without destination reached or the timer timed out.

Particular Description Of The Invention

FIG. 1 shows schematically a four-wheel-drive vehicle including a vehicle driveline. The vehicle includes front wheels 10 and 12 and rear wheels 14 and 16. An engine 18 delivers torque to an input element of a multiple-ratio transmission shown schematically at 20. The output shaft of the transmission is connected in the usual fashion, by means of a universal joint, to a rear drive shaft 22 which delivers torque to the torque input pinion of a geared differential mechanism 24, the latter delivering torque to each of two rear wheel axles 26 and 28. Although generally described with reference to four wheel drive vehicle having the rear wheels continually driven (RWD) and torque being transferred to the front wheels on an as-required basis, the present invention may be used in a vehicle having the front wheels continually driven (FWD) or an all-wheel drive system derived from either a FWD or RWD configuration.

The torque output shaft of the transmission 20 is connected to the transfer case 30. The transfer case 30 is secured to the transmission and forms a part of the transmission assembly. The torque output shaft of the transfer case 30 is connected to a front-wheel drive shaft 32, which delivers torque to a front geared differential 34. First and second front axle shafts 36 and 38 deliver torque to the front traction wheels from the differential 34. As described in U.S. Pat. No. 5,522,776 to Alvey ('776), assigned to the assignee of the present invention and which is incorporated herein by reference, a center axle disconnect clutch (not shown) is situated between one of the front traction wheels, such as wheel 10, and the differential mechanism 34. The rear axle differential 24 functions in a manner similar to the function of the front axle differential 34 and has corresponding torque transfer components.

The transfer case 30 preferably includes a single bi-directional motor 82 which actuates both the range selection between four wheel drive high 434 and low 440, and the mode selection, between two wheel drive 431 and four wheel drive 434.

For the purposes of this disclosure, "drive mode" refers to the range or drive mode selected, namely two wheel drive (2H), high range four wheel drive (4H) or low range four wheel drive (4L). As described below, the present invention enables a computer 87 to determine in which drive mode, or between which drive modes, the transfer case 30 resides at any particular moment. The transfer case 30 further includes a neutral position 437 between 4H 434 and 4L 440, wherein the engine 18 is disconnected from the drive wheels 10, 12, 14, 16. In a preferred embodiment, this neutral position 437 is not selectable by the operator and the mode select switch 112 has only 2H, 4H and 4L positions.

The transfer case may also reside in a position between drive modes, or partially engaged in a drive mode. For the purposes of this disclosure, these positions are called "BG", or "between gear", positions. These BG positions are described in more detail below with reference to the encoder 86.

The transfer case 30 includes an input shaft drivably connected to the transmission 20. A preferred transfer case 30 is similar to the transfer case described in Alvey '776, but the clutch which actuates the mode selection in a preferred transfer case 30 is preferably actuated with the same motor 82 as the range selection as described below. One skilled in the art recognizes the transfer case of Alvey '776 or any similar transfer case may use the principles taught in this invention.

As is known to one skilled in the art, the mode clutch of the transfer case 30 establishes a driving relationship through the front driveshaft 32 to a secondary axle including a differential 34. The transfer case 30 input shaft is thereby selectably drivably connectable to the front driveshaft 32 to establish a four wheel drive mode. The input shaft is further selectably connectable to the front and rear driveshafts 22, 32 through a planetary gearset to establish a gear range connect and disconnect to achieve the desired range (4H or 4L) as described in Alvey '776.

Figure 2:
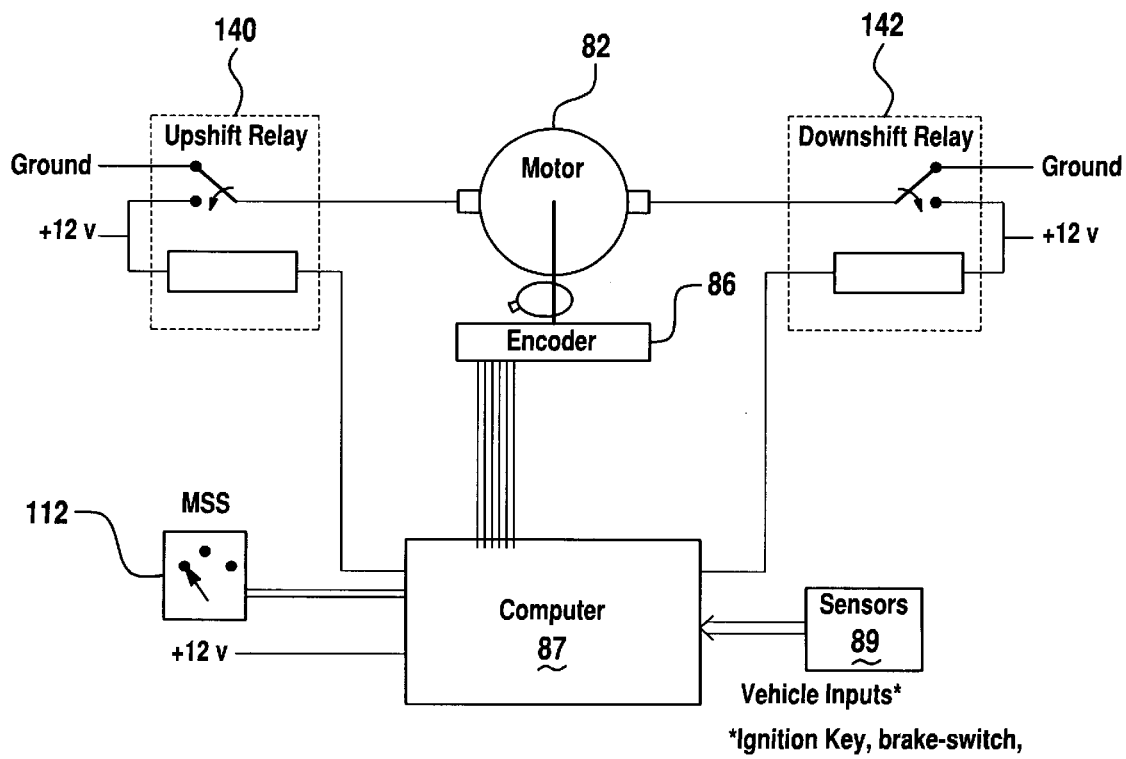
FIG. 2 is a schematic representation of an electrical and electronic system for a transfer case according to the present invention.
Figure 3:
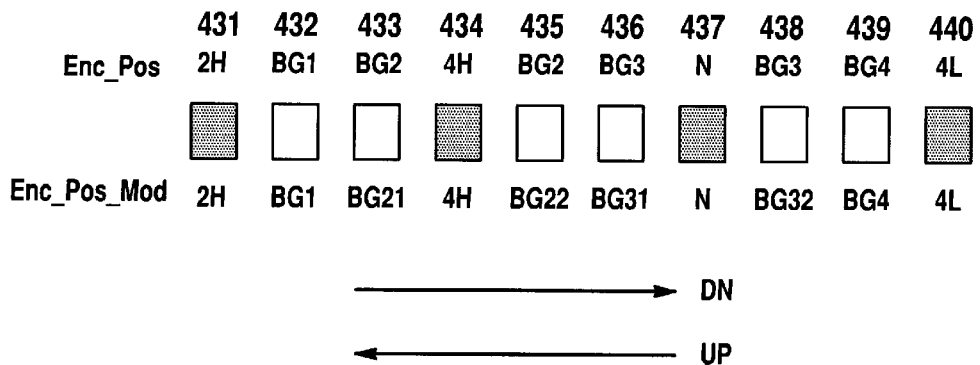
FIG. 3 is a schematic representation of the states of an encoder for use with the motor shown in FIG. 2.
Figure 3A:
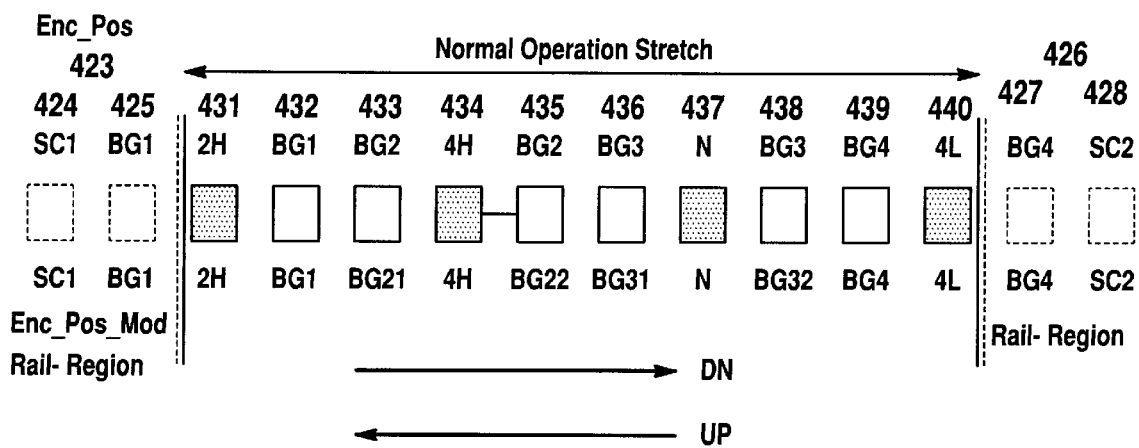
FIG. 3A is a schematic representation of the states of an alternative encoder for use with the motor shown in FIG. 2.

As illustrated in FIGS. 2 and 3, an encoder 86 is provided to detect the position of the motor 82. An encoder is described in Alvey '776 and in more detail in application Ser. No. 08/192,520 by Stollsteimer et al, which is assigned to the assignee of the present application and is incorporated herein by reference. As shown in FIG. 3A, the encoder 82 detects the position 431, 434, or 440 corresponding with the mode in which the transfer case is engaged, or a rail position 423, 426 outside the normal operating range of the transfer case. The encoder 86 also detects several between gear BG positions 425, 432, 433, 434, 435, 436, 438, 439, 427 and a neutral position 437. The encoder 86 feeds the positional information to the computer 87.

Figure 9:
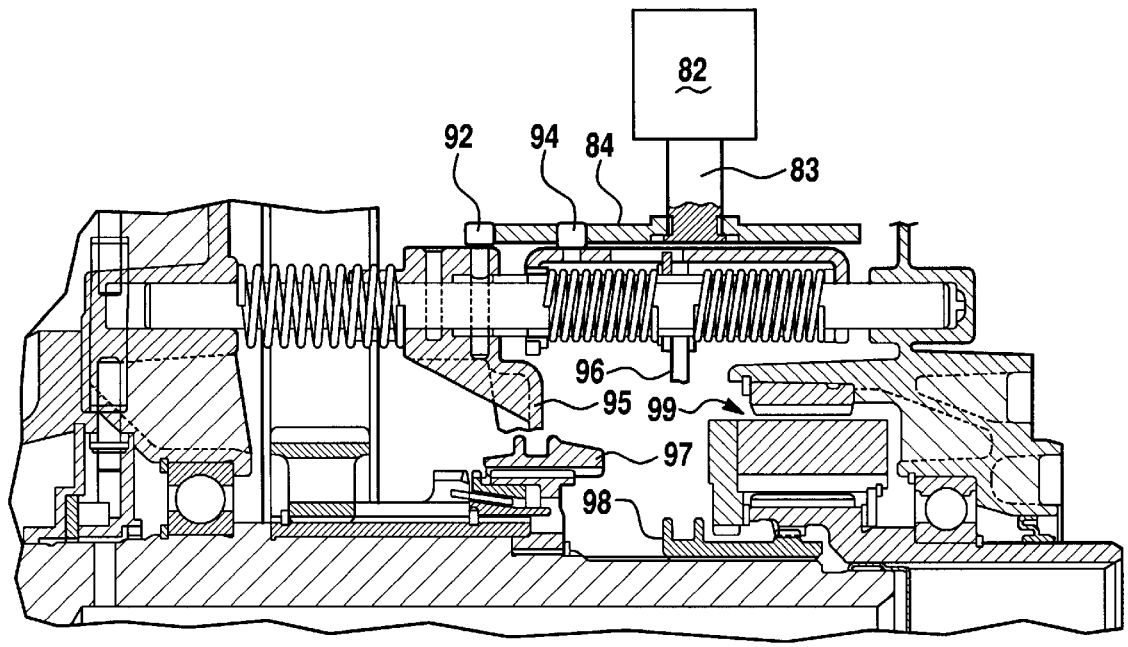
FIG. 9 is a partial cross sectional side view of a transfer case useful with the principles of the present invention.

The motor 82 illustrated in FIG. 2 operates in a manner similar to that described in Alvey '776, but includes a means for changing the drive mode between 2H and 4H, as well as a means for shifting from 4H to 4L. As shown in FIG. 9, the motor 82 has an output shaft 83 which rotatably engages a cam plate 84. Although not shown here, a reduction gearset may be provided between the motor 82 and cam plate 84. The reduction gearset (not shown) may allow motor output shaft 83 to rotate less than a full revolution from one extreme position to the opposite extreme position to produce the desired drive mode. Alternatively, the gearset may cause the motor to rotate one or more full revolutions from either extreme of travel to select each drive mode.

Figure 10:
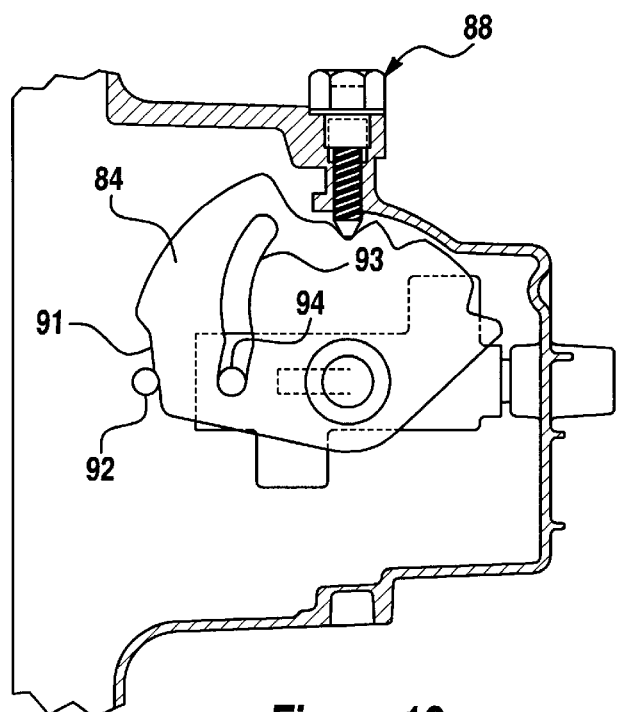
FIG. 10 is a partial cross sectional elevation of the transfer case shown in FIG. 9.

As shown in FIG. 10, the cam plate includes a first cam profile 91 which engages a first follower 92. First follower 92 engages and first shift fork 95 which moves a first shift sleeve 97 to actuate a synchronizer to engage d disengage the transfer case 30 from the front driveshaft 32 to shift between 2H and 4H modes. A second cam profile 93 is provided in the cam plate 84 and is engaged with a second follower 94. The second follower 94 is engaged with a second shift fork 96 which engages a second sleeve 98 to shift the planetary gearset 99 between 4H and 4L ranges.

As is appreciated by one skilled in the art, as the motor 82 rotates the cam plate 84 counterclockwise (CCW) as shown in FIG. 10, the first cam profile 91 moves the first follower axially leftwardly, thereby shifting the shift fork 95 leftwardly to engage 4H. During this initial rotation, the second cam profile 93 is configured to not translate the second follower 94.

As the cam plate 84 continues to rotate CCW, the first cam profile 91 no longer translates the first follower 92, but the second cam profile 93 begins to translate the second follower 94 leftwardly. As described above, the second sleeve 98 initially engages the planetary gearset 99 in a direct drive mode, but as the sleeve 98 is translated leftwardly, the planetary gearset is moved through a neutral condition. As the sleeve 98 is moved further leftwardly, the carrier is drivably connected to effect a gearing reduction and effect the 4L mode. A spring loaded pin 88 is preferably provided to engage a plurality of detents on the cam plate 84 in each of the selectable drive modes.

In a preferred embodiment, at one extreme of rotation, as illustrated in FIG. 3A, an extension beyond 2H 431 is provided to accommodate any tolerances. This extension is referred to as a first rail region. Within the first rail region, 2H is still engaged, although the position of the transfer case does not correspond with the optimal 2H position 431. A second rail region is provided at the opposite extreme of travel adjacent 4L 440. These rail regions are not commanded positions, but provide for overtravel. The following table names output shaft 83 position (θ) values in various positions for the transfer case 30:

| Physical Position | Value of θ |
|---|---|
| Rail #1 | −θa |
| 4 × 2 (2H) | 0 |
| 4 × 4 High (4H) | θ1 |
| Neutral (N) | θ2 |
| 4 × 4 Low (4L) | θ3 |
| Rail #2 | θb |

The rotary cam plate 84 is designed in such a manner that from angular position past 2H (θ>0), to a position just prior to 4H (θ=θ1), 4H is partially engaged. Preferably 2H is engaged between Rail #1 (−θa) and 4H (θ1). In a like manner, 4L is engaged anywhere from 4L (θ3)to the second rail region. Furthermore, the motor will reach up to the 4H position (θ=θ1) only when the process of synchronization is complete and thereby both front and rear axles are drivably connected to transmission. From the 4H (θ=θ1) position to 4L (θ=θ3) position, the cam plate 84 moves a shift fork 96 to effectively "add" a gear ratio between the transmission 20 and transfer case 30 output (4L). Since both axles are already drivably connected to the transfer case 30, the result is that all wheels are powered and with a gear reduction between the transmission and the axles. If the motor 82 is rotated past this point, i.e., up to some angular position before or up to Rail #2, θ3<θ<θb, the 4L gear remains connected.

If the transfer case stops and the encoder indicates the transfer case is at a BG position, a neutral position or a rail position, the controller commands the transfer case motor to shift the transfer case to the most convenient position. The most convenient position is defined as the drive mode which may be engaged most readily and easily by the transfer case without leaving the transfer case in a neutral position. The most convenient position is indicated in the above-illustrated table. The controller considers the proximity of the drive modes, whether the transfer case has to travel through neutral to achieve the drive mode, whether a blockage occurred the last time the transfer case tried to achieve that drive mode, and how the drive mode is engaged (i.e. does the shift fork move under a spring force or only under the urging of the motor).

While in the 4H position, the transfer case 30 is drivably connected to transmission 20, so when shifting to 4L the transfer case 30 is drivable disconnected from the transmission 20 through a neutral position. The neutral position is provided in the neighborhood of θ=θ2. At this point, the transfer case 30 is drivably disconnected and all four wheels are unpowered and free, but the front and rear axles are coupled together. Movement from Rail #2 or 4L to 4H via Neutral will be accomplished by movement of the motor in reverse direction (Clockwise (CW) as viewed in FIG. 10) whereby the gear will be disconnected and the transfer case 30 is connected back to the transmission 20 directly. The motor 82 moves further CW to get to 2H or Rail #1, thereby disconnecting the front driveshaft 32 from the transfer case 30.

Alternatively, the encoder may have fewer positions between the modes, thereby eliminating several of the encoder positions. For example, there may be only a BG1 between 2H and 4H, eliminating the BG2 position therebetween. This simplifies the operation at the cost of precision, but may operate using the principles of the present invention.

As illustrated in FIGS. 2 and 3, a transfer case encoder 86 indicates to the controller 87 which position the motor 82 is at any particular moment. A preferred computer 87 comprises an electronic control module, as described in the Alvey '776 patent and therefore not discussed in detail here.

In an alternative embodiment, the transfer case, as illustrated and described in the Alvey '776 patent and therefore not shown here, may be provided with a shift fork to actuate the mode selection and a motor to actuate the range selection. An encoder indicates the position of the motor for the presently selected range and a separate sensor indicates the position for the mode in which the transfer case resides. As is further described below, a computer is similarly able to determine the state of the transfer case in this alternative embodiment. In a further alternative embodiment, the motor 82 may rotate a sleeve having a helical groove provided therein to translate the shift forks described above, as described in U.S. Pat. No. 5,092,188 to Fujikawa et al, which is incorporated herein by reference.

As illustrated in FIG. 2, the transfer case motor 82 is energized alternatively by an upshift relay 140 and downshift relay 142, as described in the Alvey '776 patent. A computer 87 receives an input signal from a mode select switch (MSS) 112, by which the driver indicates a desired drive mode and drive range, as described below. The computer 87 receives further input from a plurality of vehicle sensors, indicated generally at 89.

Alvey '776 describes a known arrangement of switches and sensors which are used in a vehicle according to the present invention. The sensors 89 are known to one skilled in the art and therefore not shown in detail here. The sensors 89 include the ignition key, brake-switch, PRNDL/Clutch, and vehicle speed, which are discussed further below. These sensors 89 provide input to the computer 87 to indicate whether the operating parameters are appropriate to perform a range shift as discussed below. An indicator (not shown) may be provided to display the currently engaged and/or currently selected drive mode or encoder position. Such indicators are well known to one skilled in the art and are not discussed herein. It is understood that the ignition key in a preferred embodiment comprises a conventional ignition key as is customarily provided in a vehicle, but one skilled in the art recognizes such a key could be interchanged with a remote start system, a switch of another sort, a computer interface including a touch pad or voice recognition, or any other such device to start the vehicle. It is further understood that the present invention generally discusses a conventional internal combustion motor vehicle, but the same principles may be utilized on any such vehicle having a four wheel drive transfer case, including an electric motor vehicle.

When the computer 87 determines it is appropriate to effect a shift, the computer 87 waits a calibrated delay period (Shift_Con_Dly), then sends a command to a relay (such as the downshift relay 142 to perform a downshift, thereby closing the downshift relay 142) whereafter the motor 82 rotates in a first direction to achieve the requested shift. The delay period preferably exists for all shifts to ensure the MSS is not being switched inadvertently, and therefore the motor is not moved for undesired shifts.

As illustrated in FIG. 3, upshift refers to motor travel in a first direction to effectuate a shift toward 2H 431, leftwardly as viewed in FIG. 3, as indicated by the encoder 86. A downshift is a shift in the direction toward 4L 440, or rightwardly as viewed in FIG. 3. As the motor 82 rotates, the encoder 86 sends a signal to the computer 87, from which the computer 87 determines the present position (Enc_Pos) of the motor 82 and hence the transfer case 30. The computer 87 further modifies the Enc_Pos using the direction of travel of the motor to split codes BG2 and BG3 into distinct physical positions. The domain of Enc_Pos_Mod is: 2H, BG1, BG21, 4H, BG22, BG31, N, BG32, BG4, and 4L. In addition, the values of BG2? and BG3? are possible due to wrong codes obtained occasionally on account of noise or transients that may seep in despite of filters and debouncing. Furthermore, each time the computer 87 receives a new encoder 86 position, the computer 87 stores the prior encoder 86 position (Enc Pos_Mod_Old).

A mode shift occurs when the transfer case 30 is shifted between 2H 431 and 4H 434, or vice versa. A range shift occurs when the transfer case 30 is shifted between 4H 434 and 4L 440. As illustrated in FIG. 3, the encoder 86 indicates the drive positions, including 2H at 431, 4H at 434, and 4L at 440, and a neutral position between the drive positions, N at 437. The encoder position adjacent each drive position (Between Gear, or BG) and neutral is also indicated: adjacent 2H at BG1, 432; adjacent 4H at BG2, 433 and 435; adjacent N at BG3, 436 and 438; and adjacent 4L at BG4, 439.

It is desirable to only enable shifting of the transfer case 30 through neutral 437 only if certain conditions are met as described below, otherwise the transfer case 30 may be damaged when engaging 4H 434 or 4L 440 while the drivetrain is rotating. These parameters include ensuring the engine 18 is drivably disengaged from the transfer case 30 and the vehicle speed is substantially zero. With an automatically shifted transmission 20, verifying the engine is drivably disconnected requires a neutral sensor (one of the sensors indicated generally at 89) to ensure the transmission 20 is in a neutral state. The neutral sensor sends a signal to the computer 87, whereafter a flag is set (AT_Neutral=T). In a manually shifted transmission 20, a clutch sensor (one of the sensors indicated generally at 89) is provided to indicate when the clutch (not shown) is disconnected, thereby drivably disconnecting the engine 18 from the transmission 20. The clutch sensor sends a signal to the computer 87, whereafter a flag is set (MT_Clutch_Pressed=T) to indicate the clutch is drivably disconnected. The default for both "neutral" flags is preferably "F" and if an invalid signal is received due to an error or fault, the flag is set to "F".

A speed sensor (one of the sensors indicated generally at 89) is provided to indicate the vehicle speed When the vehicle speed approaches zero, and preferably below about 3 MPH, the speed sensor sends a signal (Veh_Spd) to the computer 87 to set a speed flag to "T" to indicate the vehicle speed is substantially zero. The default for the speed flag is preferably "F" and if the speed is not substantially zero, or if an invalid signal is received due to an error or fault, the speed flag is set to "F".

In a preferred embodiment, a brake sensor (one of the sensors indicated generally at 89) is provided to indicate that the brake pedal (not shown) is applied. This brake sensor sends a signal to the computer 87 and the computer sets a flag (Brake_Pedal=T) to indicate the brake pedal is depressed. This brake sensor acts as a safeguard if the speed sensor sends a false signal that the vehicle speed is substantially zero, as it is more likely that the vehicle is stopped when the brake pedal is applied while the other conditions are met than if the brake pedal were released, particularly when the brake pedal is depressed for the duration of the delay timer Shift_Con_Dly Elpsd_Tmr. Preferably the brake pedal flag is False at default and if an "invalid" signal occurs due to a fault or error.

Upon receiving the signals described above to indicate that a transfer case 30 shift through neutral is proper, namely:

1) the transmission is in neutral or the clutch is depressed,
2) the vehicle speed is substantially zero, and
3) preferably the brake pedal is depressed, then the computer 87 generates an output to set a raw shift condition flag (Shift_Con_Raw=T) to indicate the shift conditions are met. The default is false, so the transfer case 30 will not pass through neutral unless warranted. Upon indicating Shift_Con_Raw=T, the computer 87 starts a shift delay timer (Shift_Con_Dly_Elpsd_Tmr). The delay timer provides a short interval between the determination that the parameters are met and the shifting of the transfer case. Preferably, the delay is approximately 1 second. After the delay passes, the computer 87 sets a shift condition flag (Shift_Con=T) which enables a shift through neutral.

The time delay from the shift condition delay timer (Shift_Con_Dly_Elpsd_Tmr) ensures that if any drag torque remains in the driveline, the torque will be dissipated prior to initiating a shift, or if the mode switch 112 is being moved quickly, the shift will not be initiated until the mode switch 112 is in a proper position (2H, 4H or 4L). If there is residual drag torque at the moment the shift-motor turns to perform the shift (between 4H and 4L), the gear will not engage or disengage. The delay ensures that that torque decays out to close to zero value. The delay timer also increases the likelihood the vehicle speed will be closer to zero when the brake pedal is depressed. The drag torque of the transmission varies with the type of the transmission and operating conditions, such as idle speed, and therefore the delay timer may require modification depending on these parameters. In a preferred embodiment, the shift condition delay timer is used in any shift; i.e. between 2H and 4H to ensure the MSS is not being switched inadvertently to minimize inadvertent shifts.

In a preferred embodiment, if the value of the variables relating to the neutral sensor, or the clutch pressed sensor, or the vehicle speed sensor, or the brake pedal sensor is unknown, undefined or invalid, then Shift_Con_Raw is set to F. This strategy ensures no shift occurs if any of the sensed variables is not available.

FIG. 3A illustrates an expansion of the encoder shown in FIG. 3. As described above, the encoder positions shown in FIG. 3A include positions 423, 426 in the rail regions outside the normal operating positions 431–440. These positions are normally experienced if an error is incurred. In a preferred embodiment, as shown in FIGS. 3 and 6, these positions 424, 425, 427 and 428 are not recognized. By not recognizing these positions, the memory requirements are reduced and the function is minimally effected. However, one skilled in the art could easily split BG1 into BG11, BG12 as was done with BG2 and BG3. Likewise BG4 could be split. Furthermore, SC1 and SC2 would be recognized as terminal positions from which the motor would be commanded DN and UP, respectively, as indicated in FIG. 8 and discussed below. By providing these additional positions in the rail region, precision may be improved, particularly when an error is incurred.

Figures 4, 5:
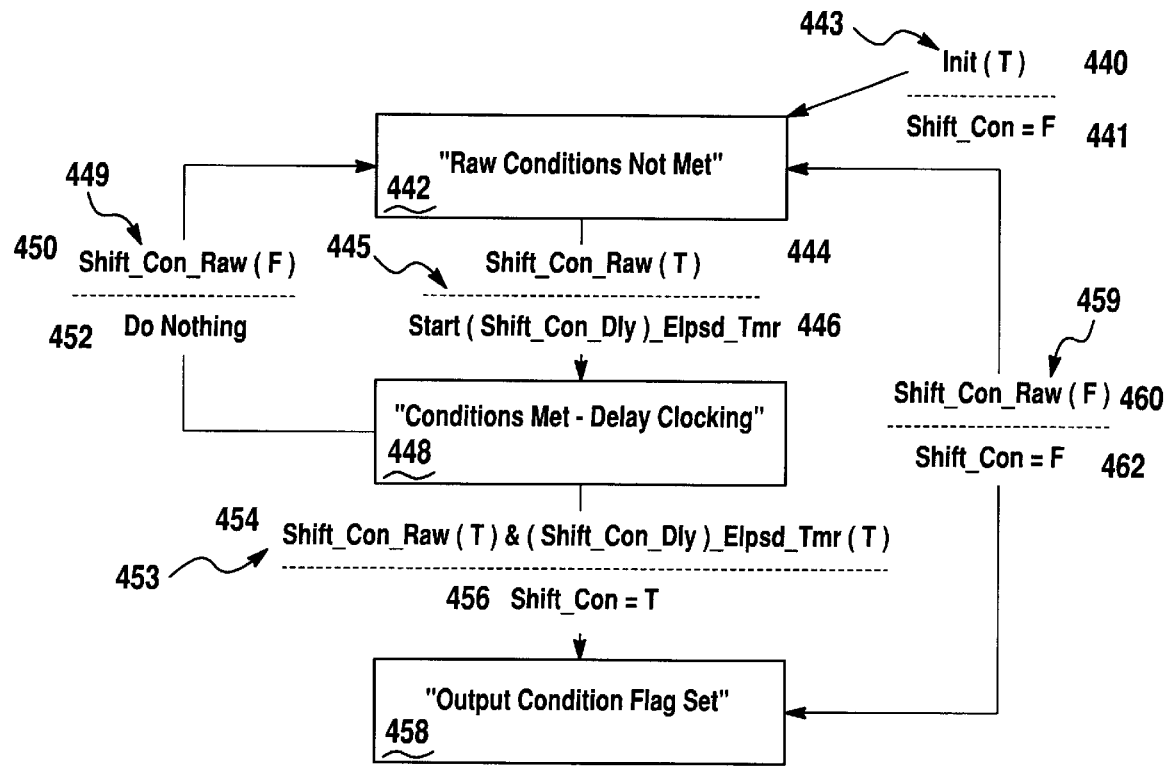
FIG. 4 is a state machine for setting a flag to permit shifting of a transfer case through a neutral position according to the present invention.
FIG. 5 is a table for determining when the transfer case motor is commanded to reverse direction according to the present invention.

A state machine is provided in FIG. 4 to illustrate the process to set a flag to enable a shift as described above. A state machine is described in detail here with reference to FIG. 4 for the purpose of understanding all state machines presented in the present application. For a more detailed description of State Machines, one is referred to "Switching and Finite Automata Theory", Second Ed., authored by Kohavi, Zvi, published in New York by McGraw Hill, 1978, which is incorporated herein by reference.

In the state machine illustrated in FIG. 4, when a first transition 443, including first event 440 occurs, the process is initialized. Within the first transition 443, upon occurrence of the first event 440, a first action 441 is commanded to set the variable Shift_Con=F, which is the default. Because Shift_Con=F, a first state 442 "Raw Conditions Not Met" is entered and shifting is not enabled.

The variables described in the definition section above are continually monitored while the process resides in each of the states described in this state machine. Preferably all variables are monitored at approximately 20 millisecond intervals. When the variables meet the specified values, a second transition 445 occurs and the second event 444 Shift_Con_Raw=T takes place as described above. After this second event 444, a second action 446 is commanded, starting the delay timer Shift_Con_Dly_Elpsd_Tmr. A second state 448 is then entered, wherein the conditions are met and the delay timer is running. If, while in the second state 448, any condition is not met, a third event occurs 450, herein Shift_Con_Raw=F again. The third action 452 comprises no action, but the first state 442 is reentered since Shift_Con_Raw=F and the commanded shift is not performed at that time.

Alternatively, if during the second state 448 all conditions are met and the timer expires, the fourth event 454 occurs and the fourth action 456 is commanded, flagging Shift_Con=T and the third state 458 is entered, "Output Condition Flag Set". If, while in the third state 458, any condition is not met, a fifth event occurs 460, wherein shift Shift_Con_Raw=F again. Upon the fifth event, the fifth action 462 is commanded, comprising setting the flag Shift_Con=F, and the first state 442 is reentered since Shift_Con_Raw=F. Thus, during the third state 458, all conditions are met and the computer 87 may command the transfer case 30 through neutral.

An example of the utility of the delay function described above includes the instance where a driver flips the Mode Select Switch 112 to a 4L position while the vehicle is being driven in 2WD or 4WD HI. According to the state machine described above, at least one of the conditions are not met and the computer 87 will not permit such a shift (which could potentially damage the transfer case). If the switch 112 remains in the 4L position and the vehicle is stopped and the transmission is shifted into park to exit the vehicle (or in a manually shifted transmission the clutch is depressed), the transmission passes through neutral. If the delay were not present, all conditions would be met and the transfer case 30 would shift to 4L unnecessarily. However, since the delay timer does not expire, the transfer case 30 is not shifted.

Another function provided by the present strategy includes feedback on the motor operation and reversal of the motor if stopped under certain conditions. At initialization, the variables Dest_State, Dir_Travel, Motor_Stopped, and At_Dest are all set to UNKNOWN. These variables are changed during operation of the motor, as described in the definition section above.

In the table presented in FIG. 5, a flag is set if certain conditions are met. Dir_Constraint generates a flag to reverse the motor to prevent overheating of the motor and to enable engagement of the transfer case. For example if the motor is stopped due to a transfer case blockage prior to synchronization when shifting to 4H from 2H, such as failure to engage the synchronizer, then the motor will be commanded to reverse. The command to reverse the motor operates only under certain conditions. Referring to FIG. 5, only when the following conditions are met:

a shift is commanded, as indicated by the direction of travel is up or down (Dir_Travel=UP or DN), the Motor is not commanded stopped (Motor_Stopped=F), and the motor has not reached its desired destination (At_Dest=F), When the conditions are met, the motor is commanded to reverse direction (Dir_Constraint=UP or DN). Otherwise, the motor is not commanded to reverse direction absent other inputs. Thus, through the Dir_Constraint, the motor is commanded to shift the transfer case to the "easiest" non-neutral position (not N or a BG position). When Dir_Constraint=NONE, the motor will rotate in a direction to best meet the driver's request. However, if the encoder shows a main-stop gear (2H, 4H or 4L), Dir_Constraint is ignored, as reversing direction will not be of help. In a preferred embodiment, the motor dwells for a short period prior to reversing direction. The "easiest" position is dependent upon the conditions described above, including proximity of the "easiest" position to the current position, any blockage, whether the transfer case is required to translate through neutral, the selected drive mode, and the mechanical design of the transfer case; i.e. if the translation occurs under a spring load, versus an external force, then the spring-loaded shift is preferred.

The present invention also includes a strategy to generate encoder information, including Enc_Pos, Enc_Pos_Mod and Enc_Pos_Mod_Old as described above. Enc_Pos is sensed. Enc_Pos_Mod_Old is determined based on the position of the transfer case as described above with reference to FIG. 3. Enc_Pos_Mod_Old is initially UNKNOWN at startup.

Enc_Pos_Mod is generated as illustrated in the table provided in FIG. 6 (the "x" indicates that the value of the variable is irrelevant). FIG. 6 illustrates the technique by which the positions BG2 and BG3 are split into distinct BG21, BG22, BG31 and BG32, respectively, as illustrated in FIG. 3. The logic assumes a value cannot be skipped, i.e. the encoder may not go from 4H to BG3 without traveling through BG2. Therefore Enc_Pos_Mod has the same value as Enc_Pos for each of the positions 2H, BG1, 4H, N, BG4, 4L, INVALID and UNKNOWN. But if Enc_Pos has the values of BG2 or BG3, Enc_Pos_Mod is generated based on the values of Enc_Pos_Mod_Old and Dir_Travel.

As illustrated in FIG. 6, when Enc_Pos=BG2 or BG3, if the value of Enc_Pos_Mod_Old is 4H or N, the value of Enc_Pos_Mod may be calculated based on a known direction of travel. If Enc_Pos_Mod_Old is a proper derivative of a BG position, then Enc_Pos_Mod is known irrespective of the direction of travel. However, if Enc_Pos_Mod_Old is not a proper value (for BG2: BG2? and BG32through UNKNOWN), or if Enc_Pos_Mod_Old is known and Dir_Travel is unknown, then Enc_Pos_Mod is BG2? For BG2. This value indicates that an error has occurred, but the position is known.

FIG. 8 provides a table which illustrates the motor control outputs, including Dest_State_Req, Dir_Req, and Tmax. These outputs are produced when the input variables meet one of the two following conditions, namely:

1) Under_Voltage=F, Over_Voltage=F and Ig_Key= Run; or
2) Ig_Key≠Start and Enc_Pos_Mod≠(2H, 4H or 4L).

The above conditions indicate it is desirable to shift the transfer case to the selected mode or range to get the transfer case out of a neutral or partially engaged (BG) state when the ignition is in any position but start (i.e. ACC, RUN, OFF, LOCK or Key out of cylinder) and the transfer case is in a position which may be neutral or BG (other than a main stop). FIG. 8 outputs are also produced when the voltage is verified to be proper and the ignition is in "run". The above conditions ensure the voltage is proper when commanding a shift of the transfer case when the vehicle is running and that the transfer case is not commanded to move when the vehicle is being started (drawing a high current). These outputs are generated only if the motor is in a stationary state 710, as shown in the State Machine illustrated in FIG. 7 which illustrates the control of the shift motor, so the motor is not commanded to change direction when the driver inadvertently flips the MSS.

As viewed in the table of FIG. 8, the motor and transfer case are protected despite rapid or frequent movement of the MSS switch 112 or if the MSS has a fault; the system will not entertain a command from the MSS unless all of the required inputs are met. If the MSS is changed during a shift, the motor is not commanded to stop immediately, to increase the likelihood the transfer case reaches a destination. Further protection is provided for the motor and transfer case when any input is changed, when a shift does not occur due to a failure in the transfer case such as a blockage, or when fluctuations in battery voltage occur. Likewise, the strategies continue to function despite the ignition key being turned off and therefore the transfer case will not be left between gears.

Figure 7:
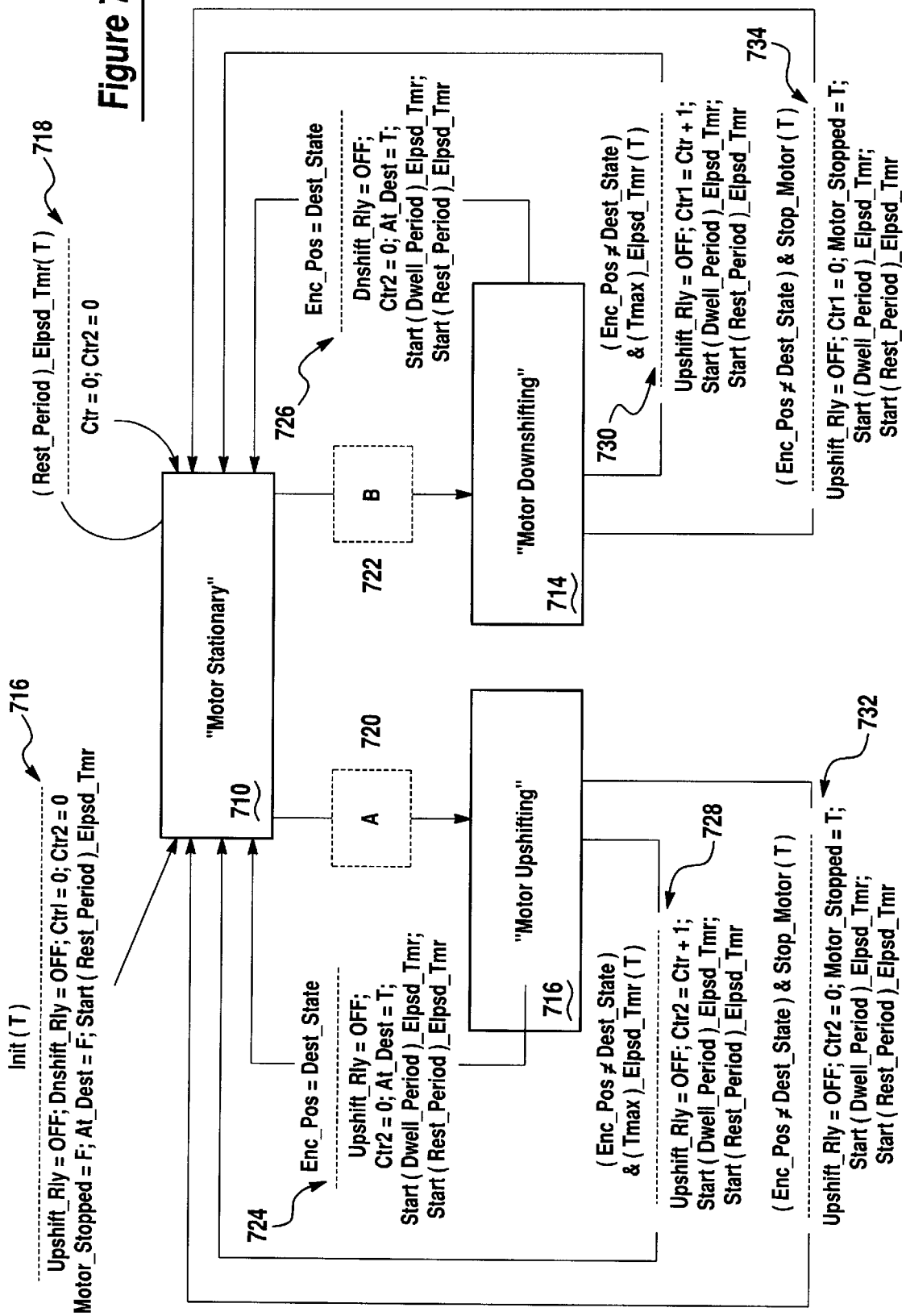
FIG. 7 is a state machine representing the conditions allowing the transfer case motor to upshift or downshift or remain in a rest state.

As seen in FIG. 8, the Dir_Constraint is irrelevant unless the transfer case is in a Neutral position or a BG position. The shift commands (Dest_State_Req, Dir_Req, Tmax) are used only if the motor state-machine is in "Stationary" state (ref. FIG. 7); that is, if the motor is not rotating.

In the case where the trivial outputs of Dest_State= NONE, or Dir_Req=OFF or Tmax=0 occur, then the motor will be commanded not to move. These trivial outputs occur where the MSS requests the present Enc_Pos_Mod or the MSS requests an invalid or unknown position or if the Enc_Pos_Mod is invalid or unknown. The trivial outputs also occur in situations where the motor looks to potentially shift through N and Shift_Con is F. Thus, the transfer case is better left in an engaged or partially engaged state (BG) than potentially ending up in a neutral state when Shift_Con=F; otherwise the transfer case may be damaged (if the vehicle is now moving the transfer case should not go through neutral).

In the other cases when the outputs indicate a valid Dest_State_Req, Tmax>0, and a Dir_Req=UP or Down, the motor may be commanded to rotate in the Dir_Req for up to Tmax seconds, or until the Dest_State_Req is reached.

The Dest_State_Req is the next stop position the motor is commanded to reach. For example, if when the transfer case is in the 2H mode, the driver moves the MSS to 4L, 4H is the Dest_State_Req, and not 4L. Once 4H is achieved, assuming the MSS is not moved, the Dest_State_Req becomes 4L and the requested shift to 4L is completed. This intermediate step is transparent to the driver. But, if the MSS is moved to 4H during the shift, the motor is properly stopped at 4H without going to 4L and returning to 4H.

As discussed above, the shift commands from FIG. 8 are not executed while the motor is moving. However, as illustrated in FIG. 7, there are several ways in which the motor will exit from any one of these states 716, 714 to the stationary state 710, including;

Reaching the destination 724, 726. In this case, Enc_Pos=Dest_State, and At_Dest is set to T. The counters are reset to zero and Motor_Stopped=F;

The destination not reached, but the timer elapsed 728, 730. In this case, the motor is stuck; the counter is incremented, Motor_Stopped=F and At_Dest=F; or Stop_Motor signal went T before reaching the destination 732, 734. In this case the counter is set to zero, the Motor_Stopped flag is set to T and At_Dest=F.

In each case, the associated relay that was "on" is de-energized to stop the motor and both Dwell_Period and Rest_Period timers are initiated 724–734. The counters (Ctr1, Ctr2) keep track of how many times in a row the motor got stuck while moving in the "Down" or "Up" direction. When the motor is commanded to stop, the respective counter is reset, since Stop_Motor is generated due to other considerations.

The motor has three states, stationary 710, upshifting 712, and downshifting 714. The defaults are set at the initialization transition 716, including shutting off both relays. Initialization 716 occurs where power is lost or a data error occurs, such as wrong codes obtained occasionally on account of noise or transients that may seep in despite of filters and debouncing.

The stationary state 710 represents the condition where both relays 140, 142 of FIG. 2 are "off". The motor remains in the stationary state until a shift transition 720, 722 occurs. As illustrated in FIG. 7A, the shift transitions 720, 722, indicated in FIG. 7 as "A" and "B", determine when it is proper to upshift or downshift, respectively and set the appropriate flags to do so and turn on the appropriate relay. The motor then enters the state of upshifting 712 or downshifting 714 until the destination is made 724, 726, wherein the appropriate variables are reset and rest timers are started.

Alternatively, if the destinations is not made and the timer exceeds Tmax 728, 730, then the relay is shut off, the Ctr1 or Ctr2 counter is incremented, the rest and dwell timers are begun, and the motor returns to the stationary state 710. The motor will attempt to make the destination until the Ctr1 or Ctr2 exceeds a calibratable limit (preferably about 5), whereafter the motor will rest for an extended period (Rest_Period). The motor cools off during the rest period before beginning the cycle again as illustrated in rest transition 718. In this transition 718, the Rest_Period_Elapsed_Timer ultimately expires and the variables CTR1 and CTR2 are reset to 0 and the motor remains in the stationary state 710 unless the shift transitions 720, 722 are met.

If the motor has not reached its destination state and the motor is stopped by a Stop_Motor=T command 732, 734, then the motor is returned to the stationary state 710. The Stop_Motor command is executed immediately and the counters are reset so as to permit a later command to be executed promptly. As viewed in the table presented in FIG. 7C, if (Ig_Key ≠START) THEN Stop-Motor=F, except for a few conditions given in the table presented in FIG. 7C. Otherwise, Stop_Motor=T. When the Ig_Key goes to START, the Stop_Motor (T) command is issued. If the encoder value is the same as MSS when a shift is commanded, then the motor is commanded stopped (if it is rotating) since there is no need to move. If it is clear that motor will eventually pass through Tcase Neutral, and the condition-flag Shift_Con has gone F, then the motor is commanded to stop, thereby protecting the transfer case, as illustrated in the last two rows in the FIG. 7C. If Tcase is in the Neutral position, the motor is not to be stopped, even though the shift conditions are disobeyed.

After each of the transitions from the upshifting or downshifting states 712, 714, the Dwell_Period elapsed timer is set and the shift transitions 720, 722 do not permit shifting until the dwell timer has expired. The Dwell_Period enables the motor to stop running after a previously energized relay is commanded off, the motor is allowed to cool slightly, and a short amount of time is allowed for the MSS to be moved quickly if the driver made an error in a prior selection with the MSS. The value of the Dwell_Period varies depending on the position of the encoder. Thus if the encoder is at a non-neutral position (2H, 4H, 4L), then the Dwell_Period is approximately 0.75 second. However, if the encoder is not at one of the these positions, then the transfer case 30 may be in a neutral position and the Dwell_Timer is set to approximately 0.02 second.

One skilled in the art recognizes that in an alternative embodiment, the MSS may include a position to command the transfer case to be shifted to a neutral position as described above. In such an embodiment the strategies described above to ensure the transfer case is not left in a neutral position are overridden, so the commanded neutral position may be achieved. Such a neutral position may be desirable to enable the vehicle to be towed. Furthermore, the above strategy may easily be modified by one skilled in the art if the electrical system is designed to permit the relays to be energized only when the ignition is in the "on" position.

The present invention accommodates several transfer case faults, including:

(1) loss of power to the encoder, (2) the motor moves when not commanded energized, (3) motor relay coil faults (4) Encoder changes without a command to move the motor (5) Bad encoder channel observed while the motor is in motion Each of these faults is addressed individually below.

1. Loss of Power to the Encoder

Figure 11:
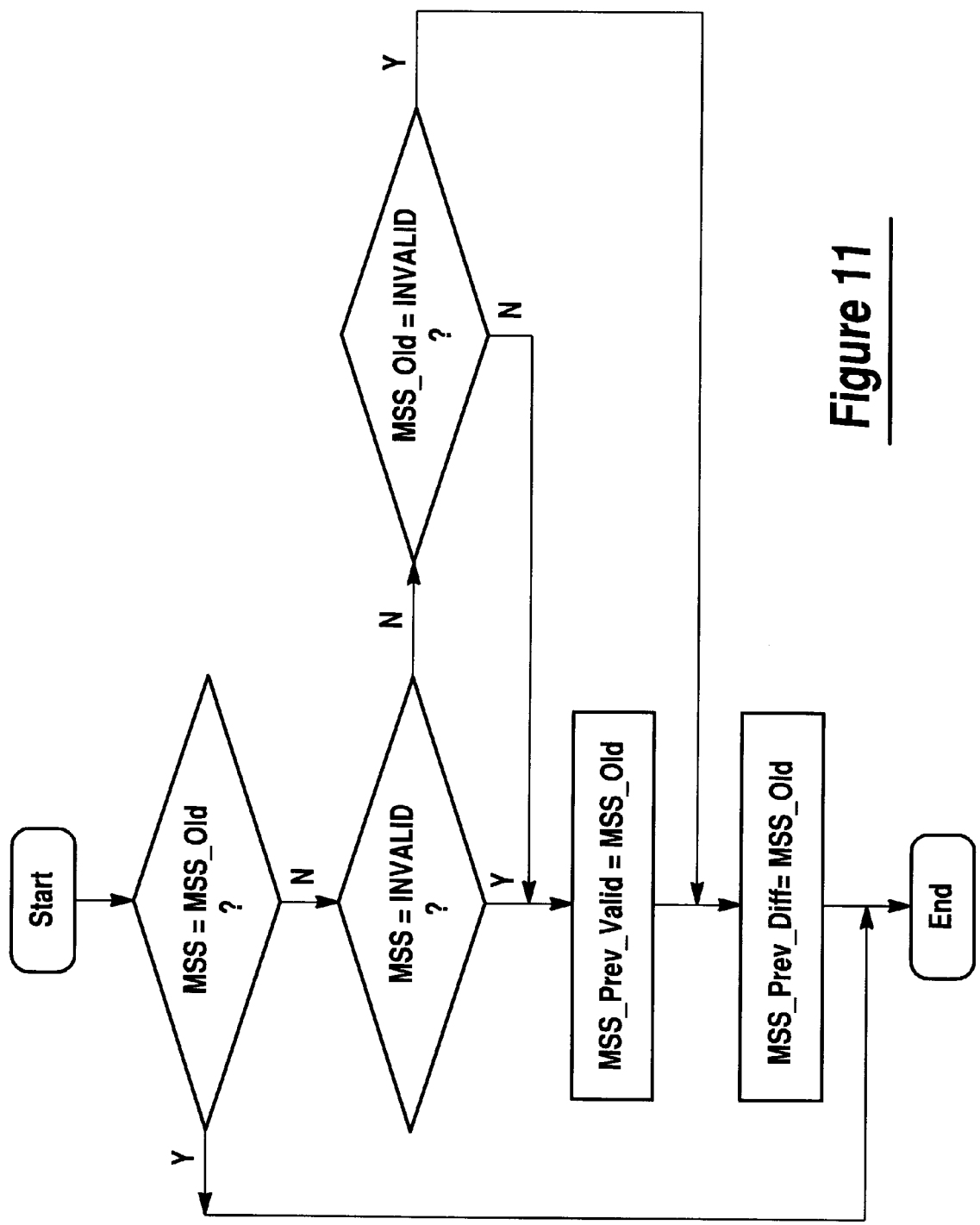
FIG. 11 is a flow chart for determining a MSS position upon encoder power loss.

FIG. 11 illustrates a flow chart for a fault comprising a loss of power to the encoder. First, it is determined if the MSS is moved and if the present and prior MSS positions are valid. Upon determination the current and prior MSS positions differ, the most recent MSS position which is different than the current MSS position is established. Next, the prior MSS position which is valid is established.

Figure 12:
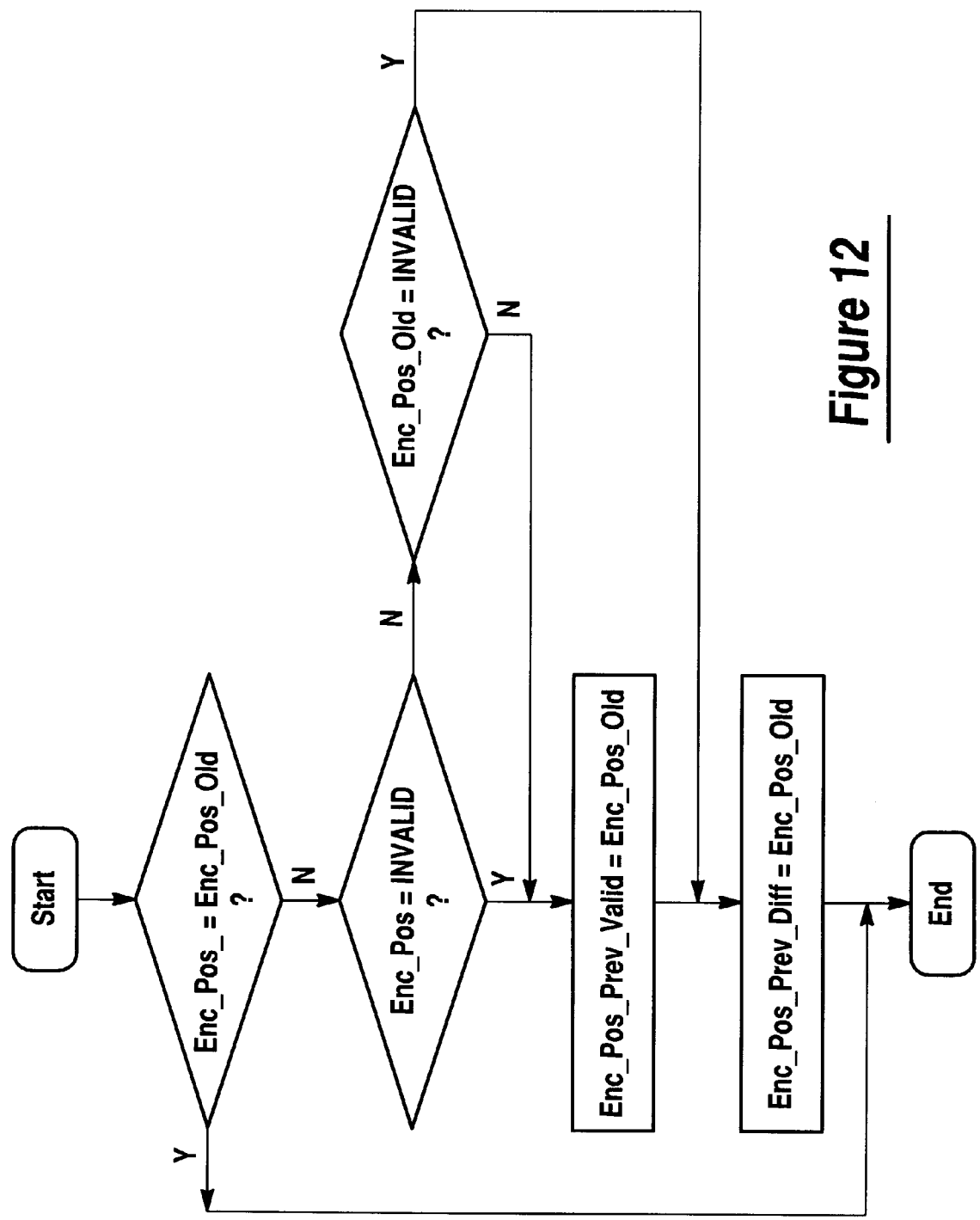
FIG. 12 is a flow chart for determining an encoder position upon encoder power loss.

FIG. 12 illustrates a flow chart for determining the encoder position, the prior valid encoder position, and the prior different encoder position.

FIG. 13 illustrates the inputs, outputs, parameters and variables for the first error detection. Once the MSS positions are established as described with reference to FIG. 12, the upshift and downshift relays are monitored to establish whether the relays are "on" or "off", and the direction of travel of the motor is established (the travel when the motor is not commanded to move). The controller determines what destination is desired, which direction to rotate the motor, the maximum amount of time required to reach the desired destination, and whether to stop the motor.

Figure 14:
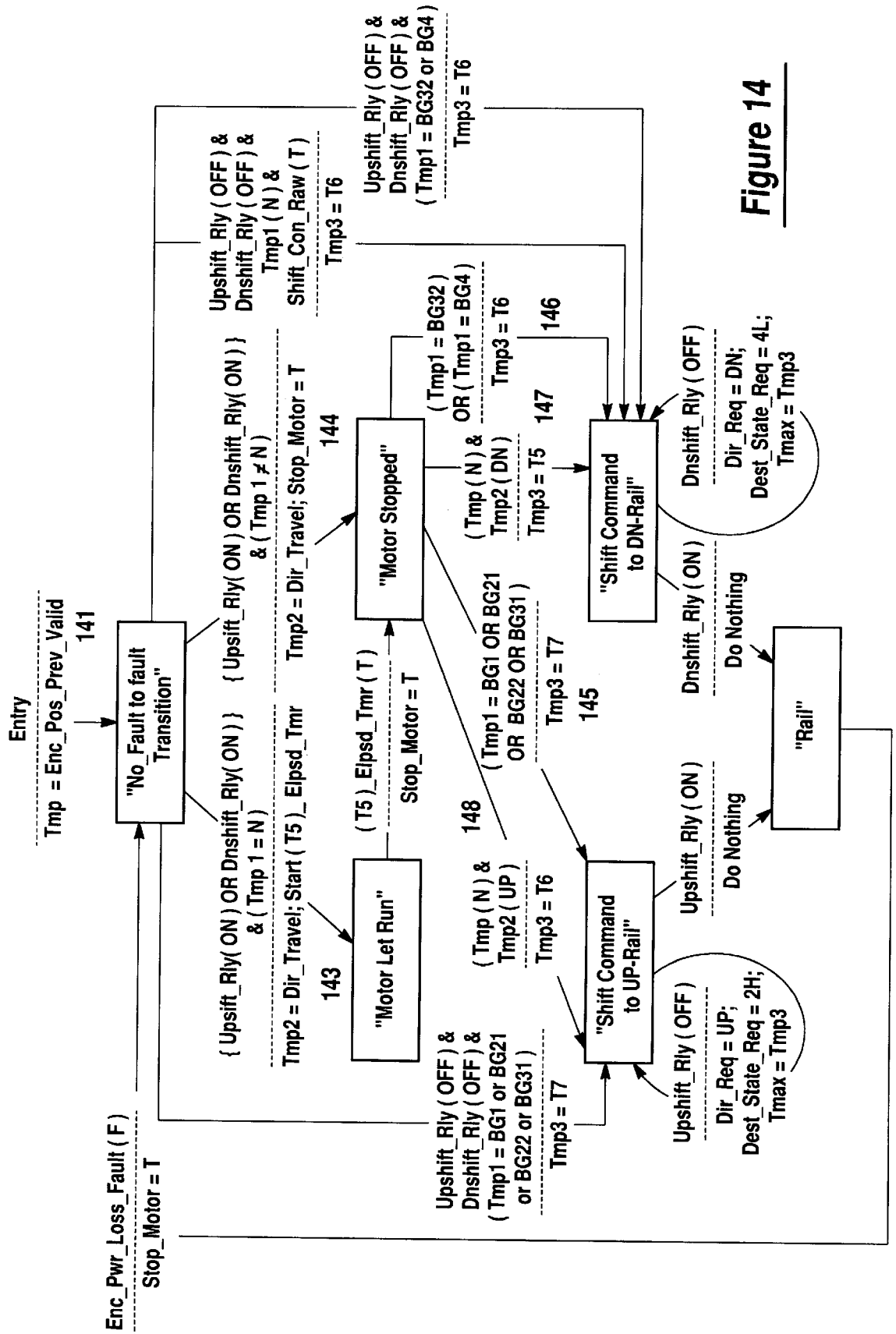
FIG. 14 is a state diagram illustrating operation upon encoder power loss.

The state machine of FIG. 14 illustrates the process for this first fault. The prior valid encoder position is stored in a temporary register (TMP1) 141. If TMP1=neutral, then the motor is permitted to run for a designated time (T5) to allow the transfer case to exit N 143. If the motor is running and TMP1≠N, then the motor is stopped immediately 144. If the motor is not energized and TMP1=BG, then the motor is commanded to rotate to the DN rail if TMP1 is on the downside of N 145, or the motor is commanded to rotate to the UP rail if TMP1 is on the upside of N 146. The prior direction of rotation is stored as TMP2. If the motor is not energized and TMP1=N and TMP2=DN, then the motor is commanded to rotate to the DN rail 147. If the motor is not energized and TMP1=N and TMP2=UP, then the motor is commanded to rotate to the UP rail 148.

2. Motor Moves When Not Commanded Energized

In such a fault, both relays are turned "on" to immediately stop the motor when either 2H, 4H or 4L is detected, or when it is anticipated that the transfer case will travel through Neutral and the shift conditions are not met as described above.

FIG. 15*a* illustrates the inputs and outputs for this fault. As shown in FIG. 15*b*, if the encoder position is at 2H, 4H or 4L, both relays are turned "on" to stop the motor. If the encoder position is x2 or x3 and the motor is rotating toward N, the relays are turned "on". Otherwise, the motor is allowed to continue to rotate until one of the above states is met.

If both relays are detected "on" (Both_Relays_On=T), then Dir_Req=Off. If the motor is not on (Motor_On_Unwarranted=F), then Both_Relays_On=F. Thus, if both relays are turned "on", then the Dir_req is set to "OFF " and if the motor is stopped, then the relays are turned "OFF".

3. Motor Relay Coil Faults

This third fault is not run if the first fault, "Motor moves when not commanded energized" is encountered, until the first fault is resolved.

This third fault is detected when one or more of the relays has a fault, including either an open circuit or short-to-battery fault, where the relay cannot be energized, or a short-to-ground fault, where the relay is energized and cannot be de-energized. With any of the first two relay faults, it is first determined whether the motor is at a main stop (2H, 4H, or 4L). If not at a main stop, the motor is commanded to rotate in the opposite direction until a main stop is achieved. If the third relay fault is detected, the motor is preferably allowed to rotate until a main stop is encountered.

Upon reaching a main stop, further shift requests are suppressed until this fault is cleared. Once such a main stop position is reached, the Dir_req is commanded "Off" and the motor is commanded to stop (Stop_Motor=T). If the transfer case is expected to travel through N, the "Motor moves when not commanded energized" logic will prevent travel through N in most cases.

4. Encoder Chances Value Without a Command to Move the Motor

This error occurs when both relays are off and the encoder value changes. This may indicate a bad prior encoder position or a bad current encoder position. The present invention suppresses any new shift commands if either the prior or present encoder positions is N and the shift conditions are not met. The present invention also keeps the transfer case at the present position if the MSS has not been moved and it is determined the transfer case is not at N. Thus, if:

---
[{Enc_Pos(N) OR Enc_Pos_Prev_Diff(N)}AND
Shift_Con_Raw(F)]
    OR
[Enc_Pos≠(N) AND Enc_Pos_Prev_Diff≠(N) AND
MSS=MSS_Old]
                THEN
Dir_Req=OFF

---

5. Bad Encoder Channel Observed While the Motor is in Motion

Figure 17:
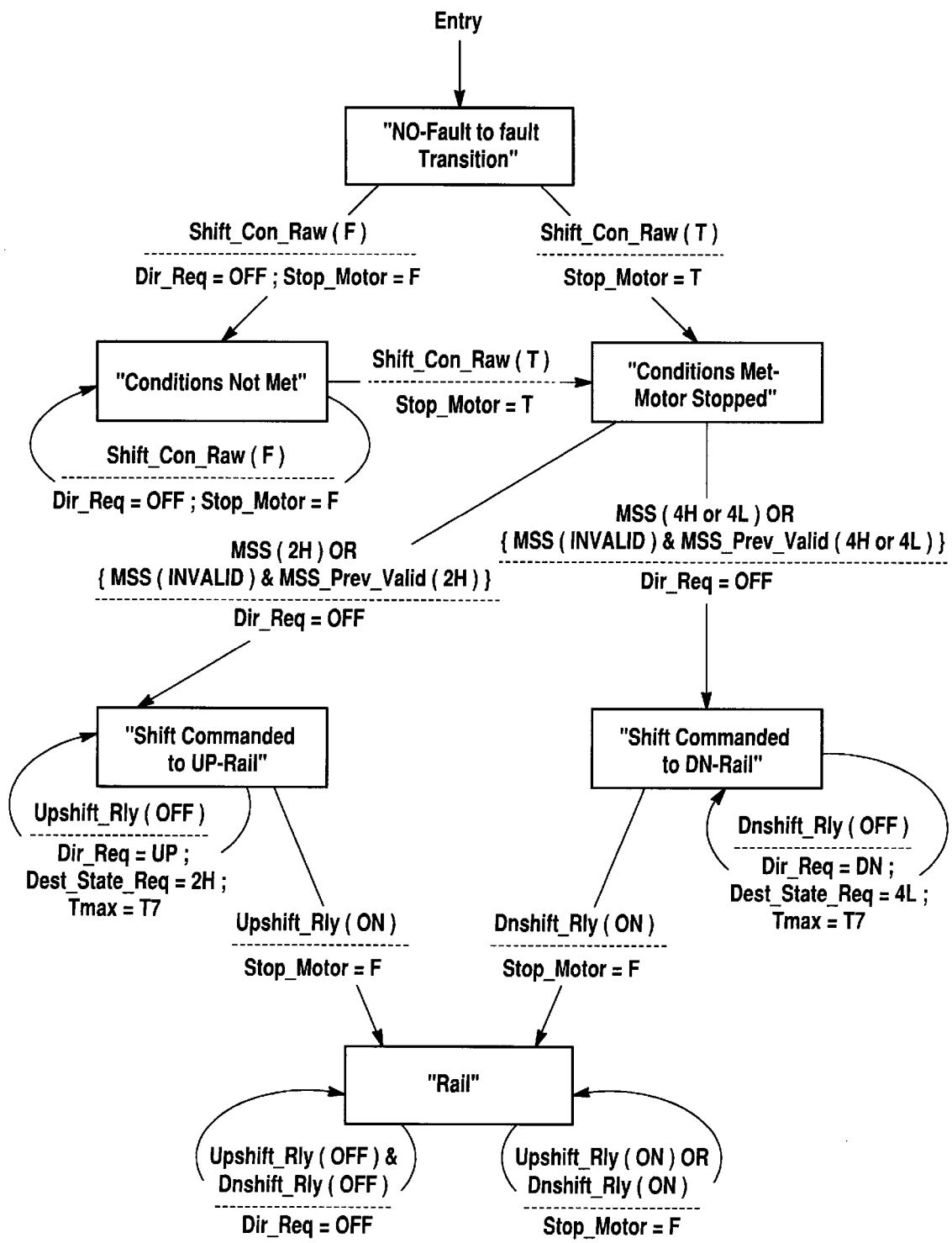
FIG. 17. is a state diagram illustrating operation upon observation of a "bad" encoder channel while the motor is in motion.

FIGS. 16 and 17 illustrate the variables, parameters and state machine for this fault. Upon such a fault, the encoder is declared to be "bad" and the worst case for "N" is assumed. The transfer case is commanded to a rail when this fault is detected.

Even though the encoder may give some valid values, it is assumed that the transfer case is in neutral when this fault is observed and further commands are suppressed. The motor is commanded to stop (Stop_Motor=T), and once the motor is stopped, the motor is then commanded to a rail position. The commanded rail position is determined by establishing the present MSS position, if valid. If the current MSS position is 2H, then the motor is commanded to the 2H position. If the MSS is a 4WD position, then the 4L position is commanded. The motor is commanded to such position for a calibratible fixed time (T7) preferably in the range of 0 to 5 seconds, or in a preferred embodiment, 3 seconds. As soon as the shift condition is met, the motor is stopped. If the current MSS is invalid, the most recent valid MSS position is used and the motor received a command to 2H or 4L as described above with reference to a valid MSS position.

A first fault Fault#-Served=0 is recognized at initialization and if the system has not recognized one of the five faults. Further, if the ignition key is not at "run" or if the voltage is not within a predetermined range, Fault#-Served=0 and the system operates as described above.

Although the preferred embodiment of the invention has been described, it will be apparent to a person skilled in the art that variations may be made to the circuit that is particularly described without departing from the scope of the invention as defined by the following claims.

What is claimed is:

1. A method for controlling a transfer case having a neutral state and a plurality of drive modes in an automatic four-wheel-drive driveline for a motor vehicle having an engine drivably connected to the transfer case, a MSS having a plurality of positions for selecting the drive modes, an upshift relay and a downshift relay to energize a motor to effect a shift of the transfer case to the selected drive mode, and an encoder for detecting a value corresponding to the rotational position of the motor, the method comprising:

sensing if the encoder has lost power;

upon sensing the encoder has lost power:
comparing a current MSS position with a MSS position prior to losing power to the encoder;
if the current and prior MSS positions differ, determining the most recent valid MSS position;
determining whether the upshift and downshift relays are turned "on";
determining the direction of rotation of the motor;
determining the desired motor destination;
determining the direction in which to rotate the motor; and
determining the maximum time to allow the motor to rotate to achieve the desired destination.

2. The method according to claim 1, further comprising the steps of:

storing the most recent prior valid encoder value as TMP1; and if TMP1=Neutral, then permitting the motor to continue to run for a predetermined time or until the desired destination is reached.

3. The method according to claim 2, wherein the encoder has a down side adjacent Neutral and an up side adjacent neutral on the side of neutral opposite the down side, the method further comprising the steps of:

determining whether TMP1=Neutral; and if TMP1 ≠Neutral, then:
if TMP1 is on the up side of Neutral, commanding the motor to rotate to an up position; and
if TMP1 is on the down side of Neutral, commanding the motor to rotate to a down position.

4. The method according to claim 2, wherein the encoder has a down side adjacent Neutral and an up side adjacent neutral on the side of neutral opposite the down side, the method further comprising the steps of:

determining a prior direction of motor rotation and storing the direction of rotation as TMP2; and if TMP1=Neutral, then:
if TMP2 is up, commanding the motor to rotate to an up position; and
if TMP2 is down, commanding the motor to rotate to a down position.

5. The method according to claim 4, further comprising the steps of:

determining whether TMP1=Neutral; and if TMP1≠Neutral, then:
if TMP1 is on the up side of Neutral, commanding the motor to rotate to an up position; and
if TMP1 is on the down side of Neutral, commanding the motor to rotate to a down position.

6. The method according to claim 1, wherein said encoder comprises a 2H position, a 4H position, and a 4L position, said method further comprising the steps of:

determining whether the motor has moved without being commanded to move, and if the motor has moved without being commanded to move:
determining the present encoder position; and
if the present encoder position is 2H, 4H, or 4L, turning both relays "on" to stop the motor from moving.

7. The method according to claim 6, wherein said encoder further comprises a x2 position and an x3 position, said method further comprising the steps of:

if the present encoder position is x2 or x3, determining whether the motor is moving toward Neutral; and if the motor is moving toward Neutral, turning both relays "on" to stop the motor from moving.

8. The method according to claim 1, wherein said encoder comprises a 2H position, a 4H position, and a 4L position, said method, upon determining the encoder has not lost power, further comprising the steps of:

detecting whether one of said relays has an open circuit or a short-to-battery fault; and upon detecting such a relay fault, commanding the motor to move in the opposite direction until a main stop position corresponding with an encoder position of 2H, 4H or 4L is reached, then commanding the motor off.

9. The method according to claim 1, wherein said encoder comprises a 2H position, a 4H position, and a 4L position, said method, upon determining the encoder has not lost power, further comprising the steps of:

detecting whether one of said relays has a short-to-ground fault; and upon detecting such a relay fault, permitting the motor to move until a main stop position corresponding with an encoder position of 2H, 4H or 4L is reached, then commanding the motor off.

10. The method according to claim 9, upon determining the encoder has not lost power, further comprising the steps of:

detecting whether one of said relays has an open circuit or a short-to-battery fault; and upon detecting such a relay fault, commanding the motor to move in the opposite direction until a main stop position corresponding with an encoder position of 2H, 4H or 4L is reached, then commanding the motor off.

11. The method according to claim 1, further comprising the steps of:

detecting both relays are off;

detecting the encoder value has changed;

determining the current encoder position;

determining the most recent prior encoder position having a different value than the current encoder position;

determining if one of the current or prior different encoder positions is Neutral;

determining whether the shift conditions are met to shift through neutral; and if one of the current or prior different encoder positions is Neutral and the shift conditions are not met, suppressing any commands to move the motor.

12. The method according to claim 1, further comprising the steps of:

detecting both relays are off;

detecting the encoder value has changed;

determining the current encoder position;

determining the most recent prior encoder position having a different value than the current encoder position;

determining the current encoder position;

determining the prior MSS position; and if both the current or prior different encoder positions are not Neutral and the current and prior MSS positions have the same value, suppressing any commands to move the motor.

13. The method according to claim 12, further comprising the steps of:

detecting both relays are off;

detecting the encoder value has changed;

determining the current encoder position;

determining the most recent prior encoder position having a different value than the current encoder position;

determining if one of the current or prior different encoder positions is Neutral;

determining whether the shift conditions are met to shift through neutral; and if one of the current or prior different encoder positions is Neutral and the shift conditions are not met, suppressing any commands to move the motor.

14. The method according to claim 1, wherein said encoder comprises a 2H position, said method further comprising the steps of:

detecting an invalid encoder position;

assume the encoder is at a neutral position;

commanding the motor to stop;

determining the MSS position; and if the MSS position corresponds with an encoder position of 2H, commanding the motor to a position corresponding with 2H.

15. The method according to claim 14, wherein said encoder further comprises a 4H position and a 4L position, said method further comprising the steps of:

suppressing any new shift commands; and determining that the MSS position corresponds with an encoder position of 4H or 4L and commanding the motor to a position corresponding with 4L.

16. The method according to claim 14, further comprising the step of determining the present MSS position is invalid and commanding the motor to a position corresponding with a rail corresponding with the most recent valid MSS position.

17. A method for controlling a transfer case having a neutral state and a plurality of drive modes in an automatic four-wheel-drive driveline for a vehicle having an engine drivably connected to the transfer case, an upshift relay and a downshift relay which energize a motor to effect a shift of the transfer case to one of said plurality of drive modes, and an encoder for detecting a value corresponding to a rotational position of the motor, the method comprising:

sensing if the encoder has lost power;

sensing if the motor is on when not commanded to be on;

sensing if one of said relays has incurred a fault;

sensing if the encoder has changed when the motor has not been commanded to move; and sensing whether the encoder has a channel fault.

18. The method according to claim 17, wherein the encoder has a down side adjacent Neutral and an up side adjacent neutral on the side of neutral opposite the down side, and wherein said motor vehicle further comprises a MSS having a plurality of positions for selecting the drive modes, the method further comprising the steps of:

upon sensing the encoder has lost power:

comparing a current MSS position with a MSS position prior to lowing power to the encoder;

if the current and prior MSS positions differ, determining the most recent valid MSS position;

determining whether the upshift and downshift relays are turned "on";

determining the direction of rotation of the motor;

determining the desired motor destination;

determining the direction in which to rotate the motor;

determining the maximum time to allow the motor to rotate to achieve the desired destination;

storing the most recent prior valid encoder detected value as TMP1;
if TMP1=Neutral, then permitting the motor to continue to run for a predetermined time or until the desired destination is reached;
determining whether TMP1=Neutral; and
if TMP1 if TMP1≠Neutral; then:
if TMP1 is on the up side of Neutral, commanding the motor to rotate to an up position; and
if TMP1 is on the down side of Neutral, commanding the motor to rotate to a down position;
determining a prior direction of motor rotation and storing the direction of rotation as TMP2; and
if TMP1=Neutral, then:
if TMP2 is up, commanding the motor to rotate to an up position;
if TMP2 is down, commanding the motor to rotate to a down position.

19. The method according to claim 18, further comprising the steps of:
determining whether the motor has moved without being commanded to move, and if the motor has moved without being commanded to move:
determining the present encoder position; and
if the present encoder position is 2H, 4H, or 4L, turning both relays "on" to stop the motor from moving;
if the present encoder position is x2 or x3, determining whether the motor is moving toward Neutral; and
if the motor is moving toward Neutral, turning both relays "on" to stop the motor from moving.

20. The method according to claim 19, upon determining the encoder has not lost power, further comprising the steps of:
detecting whether one of said relays has an open circuit or a short-to-battery fault, and upon detecting such a relay fault, commanding the motor to move in the opposite direction until a main stop position corresponding with 2H, 4H or 4L is reached, then commanding the motor off;
detecting whether one of said relays has a short-to-ground fault, and upon detecting such a relay fault, permitting the motor to move until a main stop position corresponding with 2H, 4H or 4L is reached, then commanding the motor off;
detecting both relays are off;
detecting the encoder value has changed;
determining the current encoder position;
determining the most recent prior encoder position having a different value than the current encoder position;
determining if one of the current or prior encoder positions is Neutral;
determining whether the shift conditions are met to shift through neutral; and
if one of the current or prior different encoder positions is Neutral and the shift conditions are not met, suppressing any commands to move the motor.

* * * * *